(12) United States Patent
Herrero Alvarez et al.

(10) Patent No.: US 11,338,727 B2
(45) Date of Patent: May 24, 2022

(54) DYNAMIC AND PROPORTIONAL SYSTEM FOR SIGNALING BRAKING MANEUVERS

(71) Applicants:María José Herrero Alvarez, Madrid (ES); Manuel De La Morena De Castro, Madrid (ES); Alberto De La Morena De Castro, Madrid (ES)

(72) Inventors: María José Herrero Alvarez, Madrid (ES); Manuel De La Morena De Castro, Madrid (ES); Alberto De La Morena De Castro, Madrid (ES)

( * ) Notice: Subject to any disclaimer, the term of this patent is extended or adjusted under 35 U.S.C. 154(b) by 0 days.

(21) Appl. No.: 16/629,083

(22) PCT Filed: Jul. 3, 2018

(86) PCT No.: PCT/ES2018/070472
§ 371 (c)(1),
(2) Date: Jan. 7, 2020

(87) PCT Pub. No.: WO2019/008207
PCT Pub. Date: Jan. 10, 2019

(65) Prior Publication Data
US 2020/0198532 A1 Jun. 25, 2020

(30) Foreign Application Priority Data
Jul. 7, 2017 (ES) ................ ES201700657

(51) Int. Cl.
*B60Q 1/44* (2006.01)
*B60Q 1/30* (2006.01)
(Continued)

(52) U.S. Cl.
CPC ............. *B60Q 1/444* (2013.01); *B60Q 1/302* (2013.01); *B60Q 1/0023* (2013.01); *B60Q 1/447* (2013.01); *B60T 2201/022* (2013.01); *B60Y 2200/11* (2013.01); *B60Y 2300/18108* (2013.01); *F21S 43/14* (2018.01)

(58) Field of Classification Search
CPC ........ B60Q 1/444; B60Q 1/302; B60Q 1/447; B60Q 1/0023; B60T 2201/022; B60Y 2200/11; B60Y 2300/18108; F21S 43/14
(Continued)

(56) References Cited

U.S. PATENT DOCUMENTS 6,133,852 A * 10/2000 Tonkin ................... B60Q 1/444
340/903
2002/0133282 A1 9/2002 Ryan et al.
(Continued)

FOREIGN PATENT DOCUMENTS

CA 2562207 3/2008
DE 102014106978 11/2015
(Continued)

OTHER PUBLICATIONS

Informe de Busqueda Internacional [International Search Report] dated Jan. 4, 2019 From the International Searching Authority Re. Application No. PCT/ES2018/070472. (7 Pages).
(Continued)

*Primary Examiner* — Daryl C Pope
(74) *Attorney, Agent, or Firm* — Lucas & Mercanti, LLP (57) ABSTRACT

The invention relates to a dynamic signaling system of the evolution of the braking maneuver that has visual proportionality with respect to the loss of speed of the vehicle, with fixed or programmed response sensitivity of the system in each braking maneuver, which enables visual proportionality and dynamic unambiguous representation of the variation of speed of the vehicle during braking. It can be applied with advantages to any type of vehicle, with an electric or hybrid combustion engine, with manual or automatic transmission. The system can be applied to both brake lights and the third
(Continued)

brake light (high-mount brake light) indistinctly or jointly, further reinforcing the dynamic effect of attention and the transmission of information.

11 Claims, 4 Drawing Sheets

(51) Int. Cl.
*F21S 43/14* (2018.01)
*B60Q 1/00* (2006.01)

(58) Field of Classification Search
USPC ...... 340/425.5, 426.22, 426.23, 426.32, 463, 340/464, 467, 468, 479
See application file for complete search history.

(56) References Cited

U.S. PATENT DOCUMENTS

2007/0241874 A1* 10/2007 Okpysh .................. B60Q 1/448
 340/479
2011/0304455 A1* 12/2011 Kisiel .................... B60Q 1/444
 340/479
2014/0253315 A1* 9/2014 Bement .................. B60Q 1/444
 340/479
2015/0158418 A1* 6/2015 Bingle ................... B60Q 1/444
 340/479

FOREIGN PATENT DOCUMENTS

| EP | 1193127 | 4/2002 |
|---|---|---|
| FR | 2831498 | 5/2003 |
| GB | 2483130 | 2/2012 |
| WO | WO 2004/110812 | 12/2004 |
| WO | WO 2012/103366 | 8/2012 |
| WO | WO 2019/008207 | 1/2019 |

OTHER PUBLICATIONS

Written Opinion dated Jul. 26, 2019 From the International Preliminary Examining Authority Re. Application No. PCT/ES2018/070472. (7 Pages).

* cited by examiner

DYNAMIC AND PROPORTIONAL SYSTEM FOR SIGNALING BRAKING MANEUVERS

RELATED APPLICATIONS

This application is a National Phase of PCT Patent Application No. PCT/ES2018/070472 having International filing date of Jul. 3, 2018, which claims the benefit of priority of Spanish Patent Application No. P201700657 filed on Jul. 7, 2017. The contents of the above applications are all incorporated by reference as if fully set forth herein in their entirety.

FIELD AND BACKGROUND OF THE INVENTION

The invention relates to a dynamic signaling system of the evolution of the braking maneuver that has visual proportionality with respect to the loss of speed of the vehicle, with fixed or programmed response sensitivity of the system in each braking maneuver, thus resulting in a proportional representation of illumination according to a straight line, curve, band or figure as a response to the loss of speed of the vehicle during the braking maneuver. The present invention pertains to the light indicator systems of vehicles.

Since Florence A. Bridgwood invented the first braking signal (stop sign that appeared when the brake pedal was pushed) at the beginning of the 20$^{th}$ century, this indication has evolved into the current brake lights that, incredibly after more than a century, do nothing more than indicate the same as before "that the driver has pushed the brake pedal of their vehicle".

As the speed of vehicles and the quality of roads have increased, this information is becoming increasingly insufficient, since the reaction times of the driver in response to a braking maneuver have been drastically reduced.

Subsequently, to reduce this reaction time, the third brake light (or highmount brake light) appeared in order to shorten the warning time of "driver pushing the brake pedal of their vehicle", since this third brake light can be seen (in some cases) through the rear window of the vehicles that are ahead of us, thus shortening the reaction times. Although it has been demonstrated that the third brake light does not reduce accidents by more than 5%, it is important to take into account that currently installing a third brake light is quite cheap and although it only reduces collisions by a small percentage, everything is worthwhile if it prevents accidents.

Another development that followed more than a century later were indicators of emergency braking. There are attempts to address the driver's lack of attention while driving and the unexpected events, which are responsible for many accidents, by using high intensity LED lights and/or blinking or increased intensity emitted by the brake lights (indicators of emergency braking); however, to date, the studies carried out on circulating vehicles have not shown any significant improvement and it has been observed that in the long term they will cause damage to the sight of other drivers, especially at short distances, and in any case, the emergency indication is almost always produced when it is no longer possible to avoid the accident.

The latest development, in the 21$^{st}$ century, are radars and sensors installed in the front part of the vehicles, which protect (only the vehicles that have them) from frontal impact (with a pedestrian, an obstacle or other vehicle), but they cannot prevent the rear-end collision of the vehicles that follow them (unless these vehicles have the same system) and the reliability thereof, at 100%, is in fact highly questionable. The true efficiency of these systems will be reached when all the vehicles in the world can have these systems in the front area thereof and, in addition, they are also redundant or have some other formula that increases the reliability thereof. This moment is too far away due to economic cost and problems that have not been resolved, which means that during this time there are a number of accidents involving injury and/or death, in other words, a very high social and economic cost.

Furthermore, all these systems also leave other issues unresolved:

1. When the sunlight shines on the reflectors of the brake lights of a vehicle, the reflection makes it seems as if the light is illuminated, although in fact it is not, thus creating misinformation for the other drivers. This phenomenon never occurs when the illuminated surface varies with the loss of speed, since the areas that are illuminated are easily distinguished from those that reflect the ambient light.

2. Human perception with respect to the speed of their vehicle is based on the sensitivity of the body to the inertia forces (which are very subjective) and mainly on the variation of the relative position of their vehicle with respect to the environment. In the case of fog, rain, dust, snow, etc., the perception of the relative variation with respect to the environment decreases immensely, which very often leads to a chain reaction of accidents due to rear-ending, with many drivers involved and resulting injuries to users and economic costs. The present invention does not have this problem, since it minimizes the need for external references.

3. Collective blinking of the emergency lights of several vehicles can lead to a high-value total frequency that can be harmful to one's health, creating discomfort and even epileptic seizures in sensitive people.

4. The cited systems, in the case of failure, cause the accident that they try to avoid. This does not occur in the present invention, since in the absence of a signal, the dynamic and proportional braking indication system functions as a conventional brake light (null sign that is the same for the entire illuminated surface).

Patents and utility models which increase the intensity emitted by the brake lights or vary the form thereof, provide emergency braking indications with flashing of the brake lights or by activating the warning lights by using decelerometers, mechanisms in the brake pedal, the pressure of the hydraulic circuit of the brakes, front radars, etc., when the path of the brake pedal, the pressure of the brake system, the deceleration or the distance/speed ratio exceed a predetermined value, are known, such as: U.S. Pat. No. 6,163,256, CN302166, US2017028906, UA60311, U.S. Pat. No. 5,610, 578, DE102013002308, TW201100280, KR20140129592, and others.

Almost all of them are only visible and can be understood from short distances. The visibility and effectiveness thereof depend to a great extent on the fact that the conditions of the environment are not adverse (fog, snow, rain, dust, etc.) and some of them depend on the characteristics of the vehicle, even at each moment. All these patents and utility models must be adapted to each vehicle in particular or elements must be added so that they work.

The following documents relate to systems and methods for signaling a braking maneuver in a vehicle, so as to help drivers of vehicles behind, wherein additional brake lighting elements are activated, or properties of brake lighting devices are modified, on a basis of increasing values of deceleration or brake pedal pressure: US2002/133282 (RYAN); DE102014106978 (BACHMEYER); WO2012/

103366 (ADAC); GB2483130 (LISSIAK); WO2004/110812 (ROSE); FR2831498 (DE ANGELI).

The following documents show a vehicle signaling system with a plurality of lighting elements, whose sequential activation is directly depending on the variation of the vehicle speed: EP1193127 (FUESCA); CA2562207 (LIU WEI).

The present invention does not have these problems and minimizes the need for external references.

SUMMARY OF THE INVENTION

A braking maneuver is rarely instantaneous (emergency braking maneuver), but rather it takes place over a relatively long period and it can begin as gentle, or relatively abrupt, and at any moment it may, or may not, become an emergency braking maneuver, since the maneuver itself consists of consecutive moments but with an evolution of deceleration that is not necessarily decreasing or constant over time. During a braking maneuver of any type, dynamic representation using the deceleration parameter is not possible without producing an "accordion effect" of the assembly of the lights (increasing and decreasing the amount of lights that are illuminated and therefore, the illuminated surface, due to the variation of deceleration during the indication of the maneuver), which misinforms rather than informs and it generates surprise and overreaction in the other drivers, which may lead to the accident that they are trying to avoid.

To resolve these situations, the present invention considers the problem by focusing on the concept of the braking maneuver, taking into account that which is explained above, in other words, understanding it not as an event at a given moment, but rather as a group of events that allow for the dynamic and progressive representation thereof with visual proportionality with respect to the loss of speed and a dynamic, simple and intuitive representation of the operations of the system, indicating how the braking maneuver evolves during the entire time that it lasts and therefore, indicating to the drivers that follow us the intensity of braking that is being carried out at each moment and the evolution thereof.

The first effect of the present invention, by being dynamic, is drawing attention to the braking maneuver that the driver of the vehicle is carrying out at all times (regardless of the type of maneuver at each moment). The second is to inform the other drivers of how the vehicle is braking, and in the case that an emergency situation occurs during the maneuver, the system will be operating as a pre-warning of said moment (since it has initially drawn the attention of the other drivers with the dynamic and proportional representation thereof).

As a result, the other drivers know what the driver ahead of them is doing at all times, thereby shortening the response time to any unexpected situation. The abrupt variation in the quickness of illumination and of the illuminated surface will indicate an emergency braking maneuver.

Advantages

The dynamic and proportional braking indication system does not have any of the problems or constraints of the current brake lights, including emergency lights:

In the dynamic and proportional braking indication system, it is not necessary to increase the light intensity, since the movement draws, even involuntarily, the attention of the other drivers (proof of this is that there are no other emergency vehicles with main warning lights that are static).

The present invention does not depend on one moment of braking and therefore, at that moment we are looking at the vehicle ahead, at the rear-view mirror, at the speedometer, etc., since viewing the operations thereof, which are dynamic at all times, does not create confusion.

It is independent of the characteristics of the vehicle, such as the type, engine power, brake system, vehicle load state, state of wear of the vehicle brake elements (brake pads, hoses, brake disks, wheel type and state thereof etc.) and therefore, it can be applied to any type of vehicle, without needing any type of modifications or added elements.

In the present invention, which has the illuminate surface with visual proportionality to the loss of speed of the vehicle, as well as fixed or programmed response sensitivity of the system in each braking maneuver, no "accordion effect" can occur (since the speed during the entire maneuver will be decreasing or at least constant at all times).

Visible and easily understandable representation at short and long distances.

The amount and quickness of the progression of activating the lighting elements or assemblies, which make up the illuminated surface, makes any other type of indication unnecessary for the case of emergency braking.

The loss of the sense of speed and situation does not affect the perception of the braking maneuver in the present invention. The represented braking maneuver solely depends on the understanding of the dynamic representation of braking, at each moment, given the amount and quickness of activation and the amount and quickness of illuminated lights or assemblies.

In the case of the third brake light, it is implemented as quickly as removing the existing light and placing a light with the dynamic and proportional braking indication system integrated therein.

In the case of losing the signal, the dynamic and proportional braking indication system acts as a conventional brake light.

Other differentiating advantages of this system from the industrial point of view are:

As a component of a vehicle, it can be immediately implemented in the production line of any vehicle manufacturer. It is normal that in a vehicle production line, any new element is integrated therein after three or four years, due to the modifications to be made to the manufacturing operations.

As an accessory for any already manufactured vehicle, it has the advantage of having a low cost and being easy to install, since it is not necessary to make modifications and it provides a considerable increase in safety.

The present invention does not need a data bus, sensors or any additional wiring, which, together with being independent of the electronics of the vehicle, prevents it from being able to be hacked.

In summary: Simple assembly, clear and unambiguous continuous signals, manufacture with the current means, reasonably simple understanding, high safety, low cost, able to be installed in any type of vehicle, practicality and enormous potential to prevent accidents due to rear-ending from occurring and the consequences thereof among any class and type of vehicle.

Operation:

The dynamic and proportional braking indication system has a triaxial decelerometer (or similar) that delivers the signal thereof to a microprocessor which, due to integration, obtains the speed of the vehicle at each moment of braking and a program that controls in a proportional way (of any suitable type) the activation of a consecutive series of lights (the path of activation of which can be any type of line, band or figure) that results in a variable illuminated surface (that can be, at times, constant or increasing). This gives it visual proportionality to the loss of speed of the vehicle and fixed or programmed operational sensitivity of the system during the entire time that the driver is pushing the brake pedal.

This system allows (in the case of vehicles with automatic or semiautomatic transmission) that the loss of speed due to the retention of the motor/change is reflected during braking, since there is a loss of speed of the vehicle and if the brake pedal is being pushed, it will be reflected (even if this loss of speed is not due to the brake circuit).

Evidently, the system can also solely be an indicator of emergency braking, if so desired, without needing modifications, since it is enough to program the microprocessor with speed environments, based on the initial speed detected, outside of which the lights function in a conventional way and inside of which the lights show an animated representation of illumination or simply flashes.

The microprocessor integrates, at each predetermined moment, the deceleration signal to obtain the instantaneous speed of the vehicle during the entire time that we are pushing the brake pedal; however, it locks the entire value of the speed signal greater than the instantaneous speed that was read previously, which can occur at any moment (situation that can occur, for example, going down a steep slope if the brake pedal is not pushed enough or said brakes heat up enough to cause fading). This locking means that, from a practical point of view, the system maintains the invariable indication reached until the new signal of instantaneous speed that is obtained is lower than the last decreasing speed received, at which time it will continue with the progression of activation corresponding to the successive moments.

As the speed decreases, the system is activated in a visual proportional way to the loss of speed and with fixed or programmed response sensitivity, the lights having been implemented in the two brake lights, in the third brake light or in the assembly, in a convergent or divergent manner.

The programmed fixed or variable response sensitivity of the activation of lights is a possibility that is proposed based on the fact that during any type of braking, the most critical moments are at the beginning and end thereof, such that during these moments, it is desirable for the response sensitivity and quickness of the system to be greater.

Components of the System:

Triaxial (or simple, or similar) deceleration sensor that delivers the signal thereof to:

Microprocessor that delivers to the illumination system an order for activation with visual proportionality to the loss of speed and fixed or programmed response sensitivity. Speed is the integral of deceleration over time; therefore, the microprocessor obtains it from the decelerometer at each moment and determines fixed or programmed response sensitivity of the system, based on the initial speed during each braking maneuver and the number of lights that make up the illumination system.

Program that controls the activation of the lights and allows a response with visual proportionality to the loss of speed, which provides an activation sequence, with fixed or programmed response sensitivity, which is, in any case, based on the speed read at the initial moment.

The response sensitivity results in the relation between the initial speed for each braking maneuver and the number of lighting elements implemented in each case for the representation (brake lights, third brake light or both). It can be fixed or vary in a programmed way, according to the segment and/or value of the instantaneous speed.

Electronics board (PCB) with an integrated or non-integrated deceleration sensor, surge protector and polarity reversal, voltage regulator, microprocessor, transistors, lights, resistors and capacitors necessary for the correct operations described (either brake lights, third brake light or both), or any suitable support for these elements (rigid insulating support such as the plastic or flexible material such as Kapton, etc.).

The microprocessor integrates the deceleration read at the first moment, thereby obtaining the speed at that moment, and it divides the value thereof between half of the number of lights that make up the activation phases of the third brake light (or between the number of lights that make up each brake light, if appropriate), which provides the system with the activation sensitivity that could be configured as fixed or programmed, based on the initial instantaneous speed, given the loss of speed when the brake pedal is acted on. As the speed varies, which is obtained by the microprocessor of the decelerometer, at the successive moments, the microprocessor generates activation by dynamically and proportionally illuminating the corresponding lights until reaching the zero value (if it is reached) which will coincide with the stopped vehicle (all of the lights are activated, whether they be the third brake light, the brake lights or both).

Figure 1A:
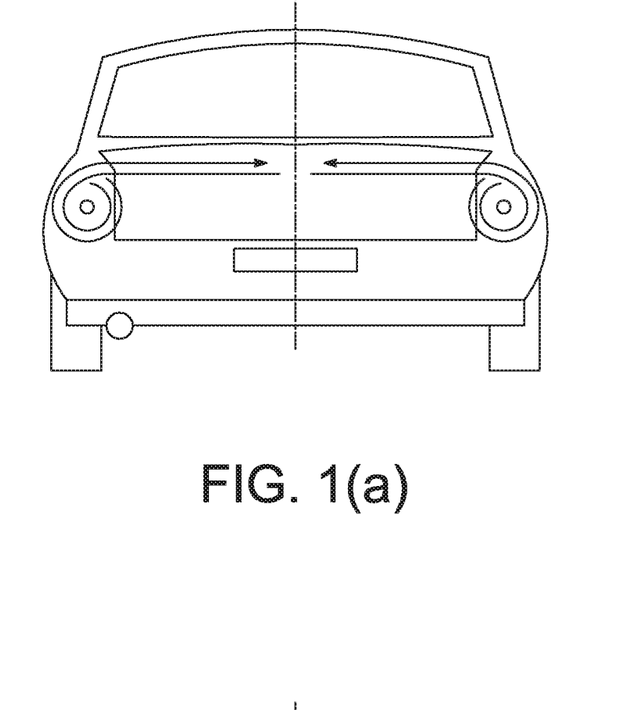
FIGS. 1(a) and 1b) represent the possibility of a pair of brake lights, with convergent activation (a) and divergent activation (b), respectively.
Figure 1B:
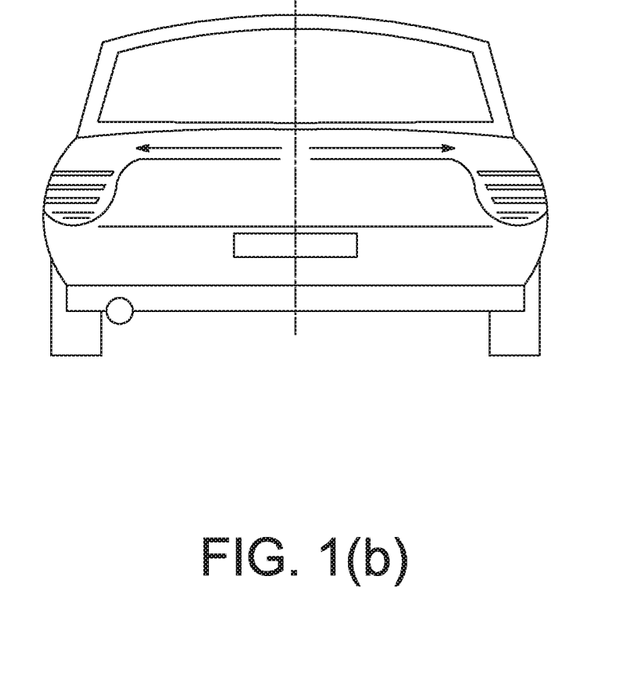
Figure 2A:
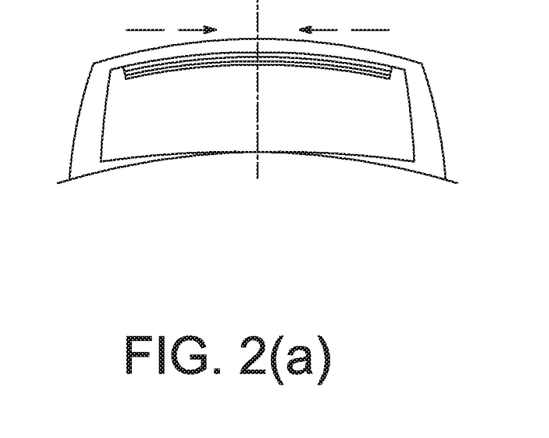
FIGS. 2(a) and 2(b) represent a third brake light (or high-mount brake light) with divergent activation (b) and convergent activation (a).
Figure 2B:
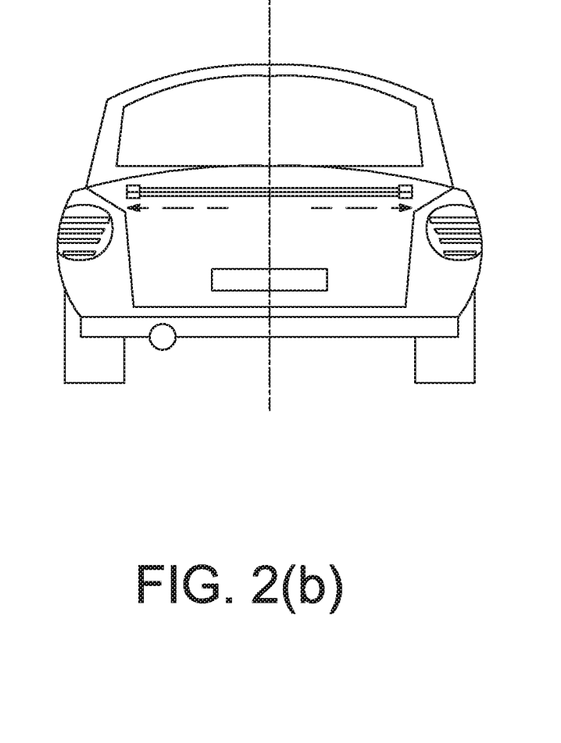
Figure 3:
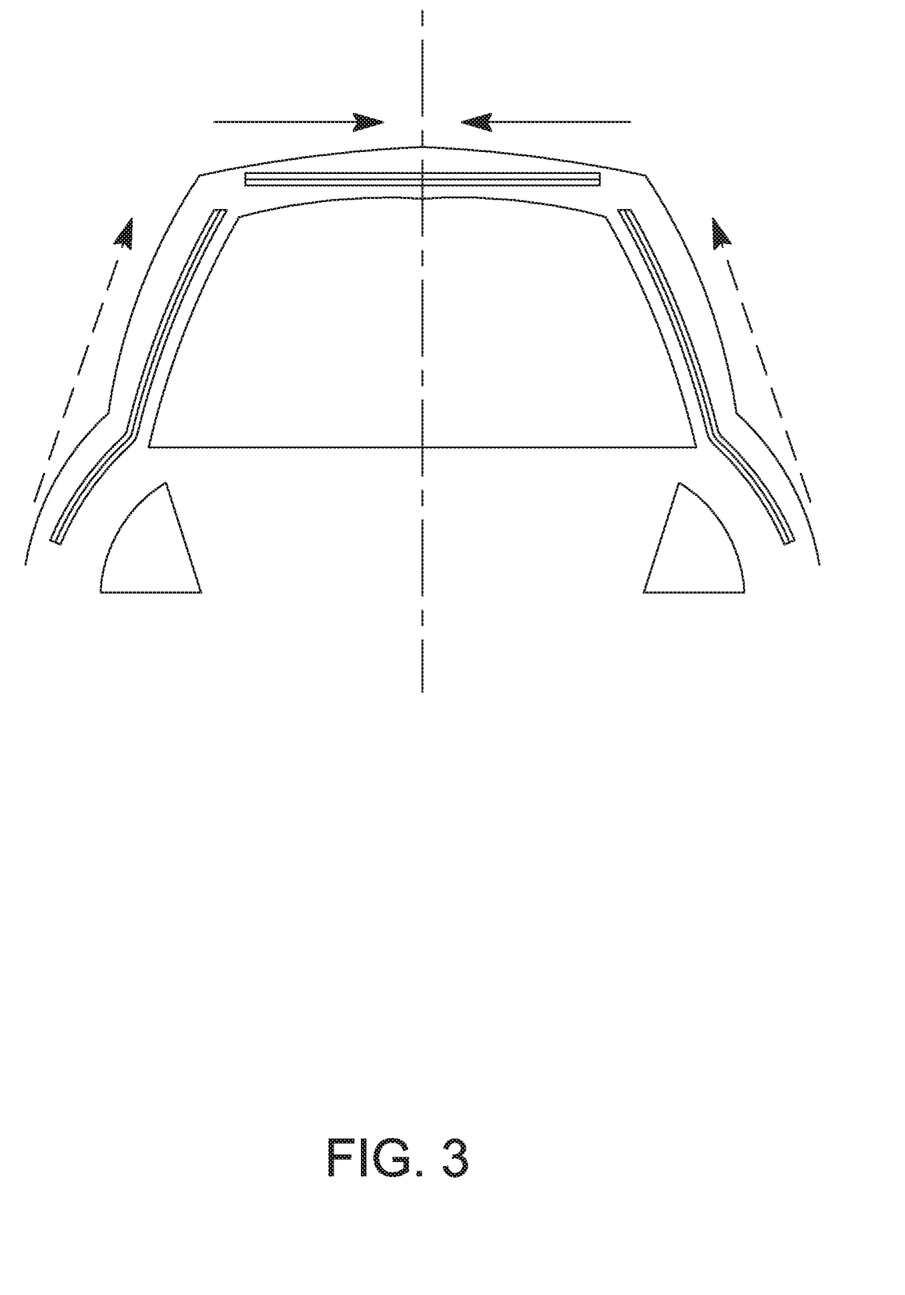
FIG. 3 shows an assembly of brake lights and third brake light acting in a coordinated convergent way (first the brake lights and then the third brake light) or in a divergent way.
Figure 4:
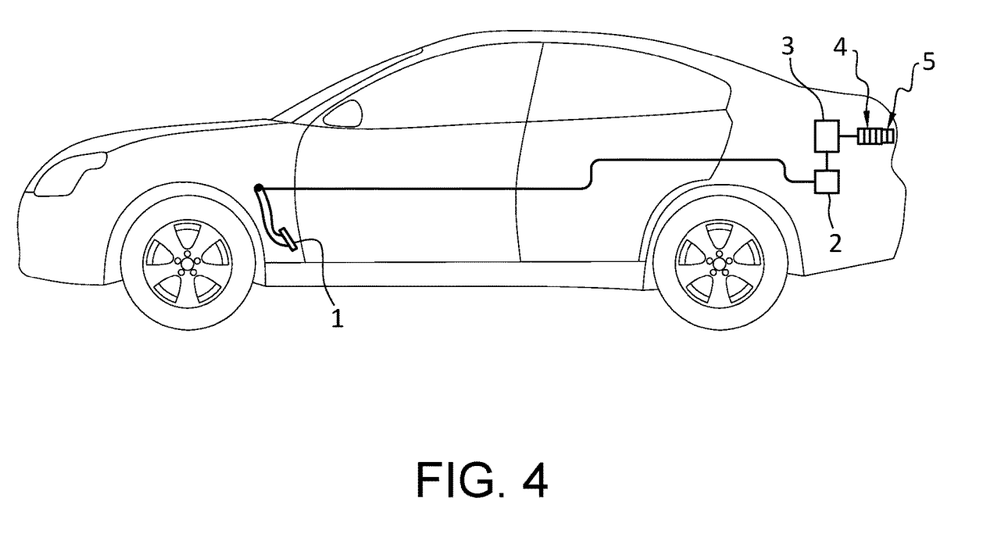
FIG. 4 shows an assembly of the brake pedal (1), decelerometer (2), microprocessor (3), lighting elements (4), additional succeeding lighting elements (5) according to the invention.

The representation of the braking maneuver is made in a visual proportional way with respect to the loss of speed and to the fixed or programmed response sensitivity of the system (in both cases, progressing the activation from the center to the edges, FIG. 1-(b) and FIG. 2-(d) or from the edges to the center FIG. 1-(a) y 2-(c)), by means of the brake lights or the third brake light (of each one or of the assembly of both elements as in FIG. 3) during the entire braking maneuver.

The signal of decelerometers (for example, that of the emergency braking maneuver) of the on-board computer or of other systems or elements of the vehicle can be used, but the use of the signals of these elements implies a data bus from these systems or elements (generally installed in the front of the vehicle) to the brake lights (always installed in the rear), with the resulting increase in cost and increase in problems of interference (emitted/received). One of the main problems in the design of any vehicle is the wiring of the electrical and electronic systems that comprise it and even more so, the data buses needed for the operations of some systems, since they can produce or receive interference that affects the operations of the systems of the vehicle itself or of others.

Evidently, in the case of aquaplaning when pushing the brake pedal, the system will indicate that the loss of speed of the vehicle as the water slows it down, independent of whether the wheels brake, are locked or not.

When divergent activation is used (FIG. 1(b) and FIG. 2(b)), independent lighting elements can be placed on the ends of the illumination line that are illuminated from the first moment that the brake pedal is pushed and they remain in this state until the pedal is no longer pushed. The usefulness thereof lies in providing information to the other drivers, which is the effective system length for when the lack of ambient light does not enable the dimensions of the brake lights or of the third brake light or of the assembly to be distinguished.

BRIEF DESCRIPTION OF THE SEVERAL VIEWS OF THE DRAWINGS

In any case of possible representation, the operations can be carried out in both a simple way and a coordinated way, and both in a convergent way and a divergent way, as well as in a dynamic and proportional way that is fixed, programmed or for emergencies.

DESCRIPTION OF SPECIFIC EMBODIMENTS OF THE INVENTION

The progressive dynamic and proportional braking indication system applied to a third brake light of any type of vehicle and operating in a divergent way (activation from the center to the edges—FIGS. 1(b) and 2(b), is described below.

This description, which does not intend to limit the scope of the present invention, is applied to a third brake light given that it is the most easiest and universal way to implement the system in any vehicle (with any number of wheels or axles, braking or propulsion system, etc.) with the lowest cost (since, from the point of view of installation, it only needs the power supply of the existing installation), while providing a considerable increase in the safety of the vehicle and the occupants thereof. The initial operation thereof is also like that of any conventional brake light but it is immediately differentiated by the fact that it is clearly and easily understandable due to the transmission of information thereof.

The system is, in this case, completely integrated into the housing of a third brake light, the decelerometer occupying a centered position with the longitudinal axle of the vehicle (for greater simplicity of the signal and of the processing thereof) and connected to the electronics board (PCB) on which the entire electronic and illumination system need for the operation thereof is mounted.

When the user pushes the brake pedal of their vehicle the electrical current reaches the third brake light of the vehicle with which the power supply of the deceleration sensor and of the PCB is produced, in other words, of the electronic assembly of the dynamic and proportional braking indication system, (it can also continuously and independently power the deceleration sensor and provide entry to the signal thereof to the system, for example, by means of a relay when we push the brake pedal), meaning that the microprocessor receives the signal of the decelerometer at that moment with which it determines the speed of the vehicle at that moment.

From this initial value obtained, the microprocessor determines an initial instantaneous speed which leads to, according to the programming thereof, a dynamic and proportional progression of activation to the speed of the successive moments during the braking maneuver, with fixed or programmed sensitivity of the value thereof. The speed at the beginning of the braking maneuver, the number of lights of the system and the installed program determine the response of the system, in other words, they determine the speed that the vehicle has to lose so that the following light (or assembly of lights) is activated and with what quickness. Therefore, with each braking maneuver, the microprocessor determines a different value of the sensitivity of the system to the variation of the speed, since the initial instantaneous speed will be, in general, different every time that a braking maneuver occurs. This obtained sensitivity can be fixed or can respond to a predetermined program according to specific moments and parameters.

In the case it is so desired, as mentioned above, having a greater sensitivity at the beginning and end of the braking maneuver or any type of similar distribution (more sensitive only at the beginning or only at the end) is enough to program the microprocessor with different environments of sensitivity or of any other suitable form.

The distribution of this sensitivity can be made for any number of environments, with different characteristics for each environment. An environment can be an operational function around the initial speed and another environment around the zero value of the speed, while in the space between both, it can be a linear function (independent of whether the activation is of one, two or more light sources of simultaneous activation). The programmed function can be the one that is mentioned or any other that is considered appropriate, the initial value thereof being determined by the relation between the initial instantaneous speed and the number of lights or assembly of lights for activation available.

What is claimed is:

1. A braking-maneuver dynamic signaling system for a vehicle having: a brake pedal, and conventional right and left side brake lights and/or a third brake light,
   the braking-maneuver dynamic signaling system comprising:
   an illumination system comprising a plurality of lighting elements mounted on each one of the right and left side brake lights and/or on the third brake light;
   a decelerometer for providing a vehicle deceleration signal; and
   a microprocessor configured to
      communicate with the decelerometer and receive the vehicle deceleration signal, and continuously obtain from the vehicle deceleration signal, both speed of the vehicle and loss of speed of the vehicle with respect to an initial speed of the vehicle, wherein the initial speed of the vehicle corresponds to a moment in which a braking maneuver starts by the brake pedal being pushed;
      determine a sequence of consecutive and additive activation of the plurality of lighting elements, while the brake pedal is being pushed along the braking maneuver, and illuminate additional succeeding lighting elements as the loss of speed of the vehicle, with respect to the initial speed of the vehicle, increases;
      determine sensitivity values indicating the loss of speed, with respect to the initial speed of the vehicle, which has to be reached for illuminating one or more additional lighting elements; and order succeeding illumination of the lighting elements according to the sensitivity values.

2. The signaling system of claim 1, wherein the sensitivity values are a function of the initial speed and the number of lighting elements on the third brake light and/or each side brake light each illumination system.

3. The signaling system of claim 2, wherein the sensitivity values are either all equal to the initial speed divided by the number of lighting elements.

4. The signaling system of claim 2, wherein the sensitivity values are not all equal but vary according to ranges of speed determined by a programmed function.

5. The signaling system of claim 1, wherein the microprocessor is programmed so that the system acts separately or jointly as an indicator of emergency braking, providing a dynamic representation in accordance with regulations for this use.

6. The signaling system of claim 1, wherein the decelerometer is further connected to the brake pedal, so that the decelerometer is only powered and delivers the deceleration signal when the brake pedal is pushed.

7. The signaling system of claim 1, the microprocessor being programmed so as to jointly produce illumination of the lighting elements of the conventional right and left side brake lights and the third brake light in a coordinated way.

8. The signaling system of claim 1, wherein the microprocessor is programmed so as to independently produce illumination of the lighting elements of the conventional right and left side brake lights and the third brake light independently.

9. The signaling system of claim 1, further comprising lighting elements, mounted at side ends of the third brake light, for staying illuminated, from the moment in which the braking maneuver starts, during the braking maneuver, to define the ends of the lightning surface and which stay illuminated, independently of the loss of speed, upon pushing the brake pedal.

10. The signaling system of claim 1, wherein the microprocessor is programmed so as to disregard any value of the speed that is greater to any value previously detected in the same braking maneuver.

11. A vehicle comprising the signaling system of claim 1.

* * * * *